United States Patent [19]
Alborante

[11] Patent Number: 5,902,496
[45] Date of Patent: May 11, 1999

[54] DEVICE FOR SPOT WELDING OF STRUCTURES CONSTITUTED BY METAL ELEMENTS, PARTICULARLY MOTOR-VEHICLE BODIES OR SUB-ASSEMBLIES THEREOF

[75] Inventor: Giancarlo Alborante, Trofarello, Italy

[73] Assignee: Comau S.p.A., Turin, Italy

[21] Appl. No.: 08/834,300

[22] Filed: Apr. 15, 1997

[30] Foreign Application Priority Data

Oct. 8, 1996 [IT] Italy .................................. T096A0817

[51] Int. Cl.⁶ .................................................... B23K 11/10
[52] U.S. Cl. ......................... 219/86.24; 219/158; 228/4.1
[58] Field of Search ............... 219/86.24, 117.1, 219/158, 159, 160, 161; 228/4.1, 47.1

[56] References Cited

U.S. PATENT DOCUMENTS

| | | | |
|---|---|---|---|
| 4,162,387 | 7/1979 | De Candia | 219/86.24 |
| 4,682,722 | 7/1987 | Bossotto et al. | 228/4.1 |
| 4,905,884 | 3/1990 | Alborante et al. | 219/158 |
| 5,111,988 | 5/1992 | Strickland | 219/161 |
| 5,174,488 | 12/1992 | Alborante | 228/4.1 |

*Primary Examiner*—Clifford C. Shaw
*Attorney, Agent, or Firm*—Sughrue, Mion, Zinn, Macpeak & Seas, PLLC

[57] ABSTRACT

A welding station, for example for welding motor-vehicle bodies, receives only a part of the structure to be welded from a conveyor line, the remaining components of the structure being assembled with said part at the welding station itself, by using two locating gates which receive said components from manipulating robots, said robots also providing for carrying out the spot welding of the structure once the latter has been assembled and locked in a proper welding position by said locating gates. The locating gates are provided with self-propelled lower trolleys guided on rails, in order to be rapidly interchanged with another pair of locating gates adapted to a different type of body.

6 Claims, 2 Drawing Sheets

DEVICE FOR SPOT WELDING OF STRUCTURES CONSTITUTED BY METAL ELEMENTS, PARTICULARLY MOTOR-VEHICLE BODIES OR SUB-ASSEMBLIES THEREOF

BACKGROUND OF THE INVENTION

The present invention relates to devices for spot welding of structures constituted by metal elements, in particular motor-vehicle bodies or sub-assemblies thereof, of the known type comprising:

a welding station, provided with automatic spot welding means, a conveyor line for feeding the welded structures going out of the welding station in sequence downstream thereof, at least first and second locating gates which are rapidly interchangeable at the welding station and carry devices for clamping the component elements of the structure to be welded in the proper mutual assembling position, said locating gates being adapted to operate respectively on two different types of structure to be welded, the locating gate which each time is at the work area in the welding station being further movable transversally to the conveyor line between an operative position, in which the clamping devices carried by said gate locate the components of the structure which is at the welding station in the proper mutual position, and an inoperative position, in which the locating gate enables the welded structure to go out of the welding station, each locating gate being provided with a self-propelled lower trolley guided on a rail provided along the floor of the welding station, in order to be movable between a work position at the welding station and a waiting position spaced apart therefrom, so that the station has no supporting frames for elements guiding movement of the locating gates.

A device of the above described type has formed the subject of European patent application EP-A-0 642 878 of the same Applicant. The latter has been manufacturing and marketing for years a flexible welding system, identified with the trademark "ROBOGATE", whose basic concept has been originally disclosed for example in U.S. Pat. No. 4,256,947 and in the corresponding German patent No. 28 10 822 and which gave raise with the time to a number of subsequent improvements and variants which also have formed the subject of various patents of the Applicant. The ROBOGATE system has indeed determined a turnaround in the welding technique of motor-vehicle bodies which had been generally used up to the end of the seventies and has replaced the previous equipment used with many car manufacturers all over the world. In a basic version of this system, it comprises two or more pairs of locating gates which are rapidly interchangeable at the work position in the welding station and are to operate on respective types of bodies. The system is able to operate on bodies which are even very different from each other, so that a same line can be used for the production of different models. A further advantage of the ROBOGATE system lies in that it can be adapted with relatively simple and rapid operations and thus with very reduced investments to the production of a new model of body. Another advantage lies in that a uniform quality is insured on all the models of a same type on which the system operates.

The prior art constituted by the ROBOGATE system provides that each body to be welded reaches the welding station in a loosely pre-assembled condition. Indeed, upstream of the ROBOGATE welding station, there are provided one or more hemming stations, at which the various elements constituting the body are loosely assembled with each other by bending connecting tabs. This provisional connection is naturally a loose connection, i.e. it allows small movements of each element with respect to the adjacent elements. Just for this reason, the locating gates provided at the welding station have clamping devices which engage the various parts of the body in order to clamp them in the proper assembling position before welding spots are applied by the robots which usually constitute the welding means provided at the station. Once a number of welding spots has been applied on the body (at one or more ROBOGATE stations) sufficient to provide the body with a stable geometry, the body proceeds towards further stations for completing welding, which do not require the use of clamping devices.

Subsequently to the above mentioned patents, the Applicant has filed further patents relating to various improved versions and developments of the ROBOGATE system. A last one of these improvements has formed the subject of European patent application EP-A-0 642 878 which has been mentioned above. In this document there is disclosed a welding station which has a much less complicated, lighter and more flexible structure with respect to the prior embodiments of the ROBOGATE system. In the most conventional solutions, said locating gates are slidably guided, in order to enable them to be rapidly interchanged at the work position with the gates provided for a different type of body to be welded, on overhead guides directed parallel to the direction of the conveyor line in the welding station, which require the provision of strong fixed supporting frames. These frames, beyond greatly contributing to the cost and the bulk of the welding station, also make difficult for the welding robots to find the space necessary to operate on the body to be welded. In the solution disclosed in European patent application No. EP-A-0 642 878, each locating gate is movable separately from the other gates since it is provided at its lower part with a self-propelled trolley which is guided on a rail provided along the floor of the welding station. Therefore, the locating gates do not require the provision of longitudinal guides which extend throughout the whole length between their work position and their waiting position, and hence do not require the provision of the heavy and bulky supporting frame, constituted by gantry structures connected to each other longitudinally, which was necessary instead in the classic ROBOGATE solutions. Thus, the space available for the welding robots is greatly increased, which enables also, if desired, the number of robots to be increased in order to obtain an increase of the welding spots applied during a determined time interval. The robots themselves may access more easily to all the parts of the body to be welded in order to carry out proper weldings. Furthermore, since each locating gate is movable separately from the other gates, the pitch between each gate and the subsequent gate in the line is free and variable, which provides a great flexibility in design and installation of the plant. Furthermore, the installation of the plant is of a more reduced cost with respect to that of the conventional plants.

The embodiment which is disclosed in the above mentioned European patent application EP-A-0-642 878 relates to a case in which all the components of the structure to be welded, in the specific case of a motor-vehicle body, are brought to the welding station from said conveyor line, which has support means of any type on which the various components of the body are suspended in positions close to each other. When the components of a body to be welded reach the welding station, the locating gates close on these components and locate them in the proper assembling position, in which the robots may carry out the welding spots.

However, the use of locating gates provided at their lower parts with self-propelled trolleys, with the resulting possibility of eliminating the conventional fixed support structure at the welding station, opens to designers the possibility of providing welding stations which operate also according to different criteria, while keeping the same advantages of the solutions which have been described above. This is true both in the case that the structure on which the system must operate is a whole motor-vehicle body, and in the case it is instead only a single body sub-assembly.

SUMMARY OF THE INVENTION

The object of the present invention is that of further improving the above mentioned known systems while saving their advantages.

A first basic feature of the welding device according to the present invention lies in that said conveyor line each time feeds only one part of the structure to be welded to the welding station and in that said device further comprises manipulating means for picking up the remaining component elements of the structure to be welded from respective loading posts, said remaining component elements being for forming said structure along with the part thereof which is already at the welding station, by being brought there by said conveyor line, said manipulating means being adapted to deliver said remaining components picked up from said loading posts to the locating gate which is at the welding station, and said locating gate being adapted to receive and support these components by its clamping means, so that when the locating gate is brought to its operative position it causes the components supported thereon to be assembled with the part which is already at the welding station, so as to locate the whole structure for welding.

Due to said features, the assembling operation of the body is further simplified. Indeed the hemming stations which were provided in the most conventional solutions upstream of the ROBOGATE station, in order to form a loosely pre-assembled body before welding was carried out, are completely eliminated. Furthermore, the conveyor line is simplified and of lower cost, also with respect to the embodiment shown in European patent application EP-A-0 642 878, since the complete structure is formed starting from its single components only at the welding station, and not upstream thereof.

Preferably, said automatic spot welding means comprise programmable robots provided with welding heads and constituting also said manipulating means which deliver the components of the structure to be welded to the locating gate which is at the welding station, said robots being provided with manipulating tools interchangeable with said welding heads.

In the case in which the structure to be welded is a motor-vehicle body, the device according to the invention is characterized in that, according to a technique known per se, there are provided two pairs of locating gates at the two sides of the conveyor line, which are rapidly interchangeable at the welding station, the gates of the pair which is at the welding station being close to each other in said operative position and being spaced apart from each other in said inoperative position. In this case, the conveyor line feeds the welding station with the floor of the body to be welded, whereas the locating gates receive two respective side panels from the manipulating means, which side panels are to form the body to be welded along with said floor, as well as with one or more cross-members which connect the two side panels at the top. According to a further preferred feature, at least one of these cross-members which form the body is carried by a bridge-like cross structure which is mounted so as to connect the upper parts of the two side gates to each other when the latter are in their close operative positions. Said cross structure is indeed provided also with clamping devices, in order to support and locate the respective cross-member of the body.

Yet according to a further preferred feature, there are provided means for interchanging the pair of locating gates which are in a waiting position with yet a further pair of locating gates, corresponding to a further type of body to be welded, which is picked up by a magazine of additional locating gates corresponding to further different types of body.

Due to the above indicated features, the system according to the invention keeps all the advantages of the ROBOGATE system, and the system forming the subject of European patent application No. EP-A-0 642 878. At the same time, the system is further improved from the standpoint of simplicity and rationalization of the plant. In particular, in the case of the present invention, the various components of the structure to be welded are assembled together, for carrying the welding, at the welding station itself, without the need therefore of providing a conveyor line which feeds the whole structure to be welded to the station, since said locating gates also fulfil the function of taking over the elements of the structure from the manipulating robots and to bring these elements in the assembling position, where the locating gates themselves provide to clamp them for welding.

BRIEF DESCRIPTION OF THE DRAWINGS

Further features and advantages of the invention will become apparent from the description which follows with reference to the annexed drawings, given purely by way of non-limiting example, in which.

DETAILED DESCRIPTION OF THE INVENTION

Figure 1:
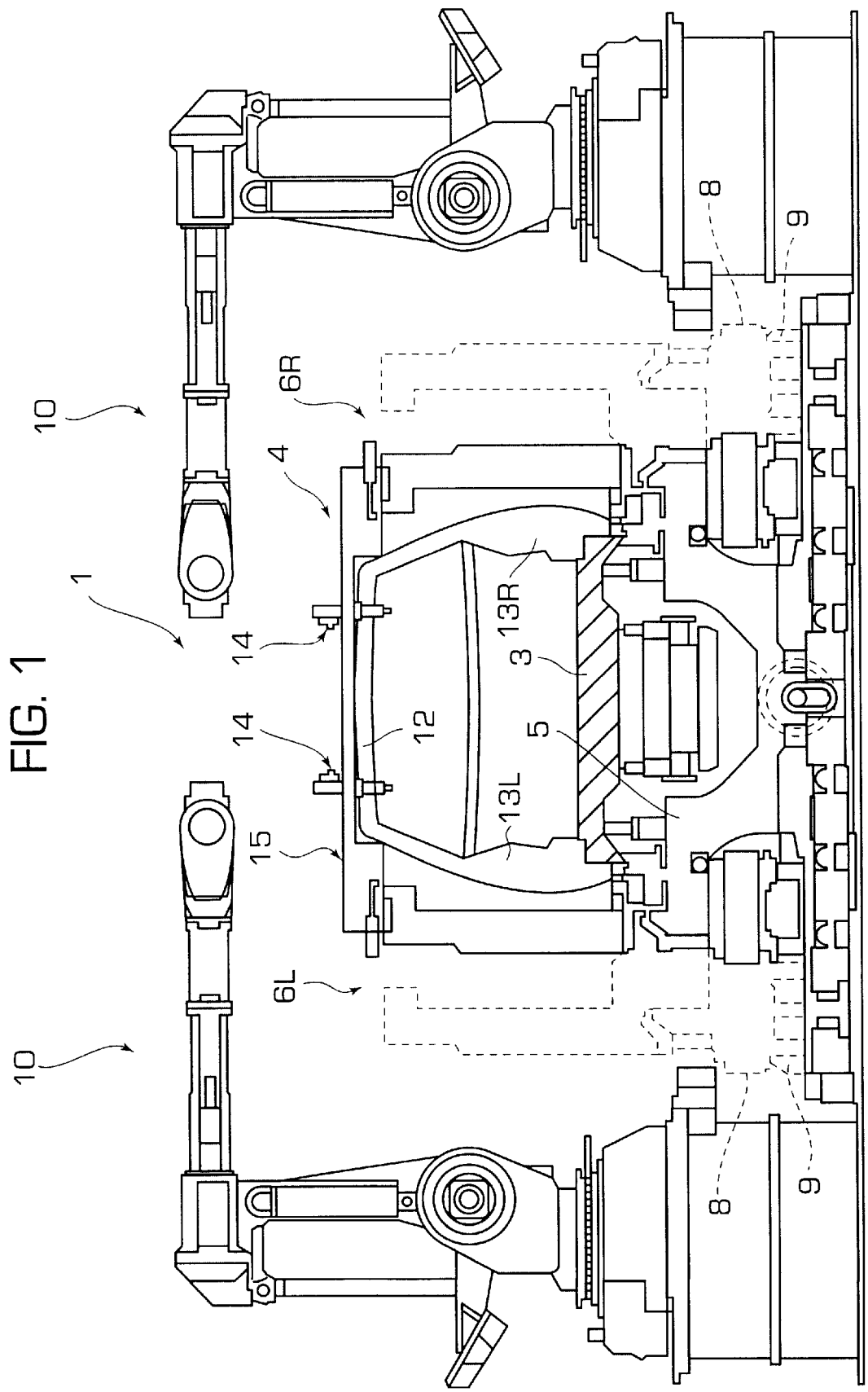
FIG. 1 is a cross-sectional view of a welding station according to the invention.

In the drawings, reference numeral 1 generally designates a welding station according to the present invention, which is for framing motor-vehicle bodies made of metal elements by spot welding. The term "framing" as used herein means the application of a number of welding spots sufficient to give a stable geometry to the body. It would be possible of course to provide more than one station of the type of station 1 in order to carry out the framing. Indeed, it is possible to provide a single station for framing the whole body of the motor-vehicle, or for instance two stations in sequence, one of which is used to frame the inner structure of the body, whereas the other serves to frame the outer elements of the body on the inner structure of the body. When the framing operation has been completed, the bodies are caused to advance, in a way known per se, towards further stations for completing welding, which have a much more simplified structure, since they do not require locking devices for holding the elements to be welded in the proper welding position.

In the case of the illustrated example, the welding station 1 is for operating on two different models of body. The invention may be applied however also to the case of one station adapted to operate on more than two different models, since it is necessary in general to provide a number of pairs of locating gates equal to the number of models involved.

By reference numeral 2 there is diagrammatically shown a conveyor line for conveying the floor panels 3 of the bodies 4 to be welded in sequence through the welding station 1. The specific structure of the conveyor line and the details of construction thereof can be made in any known way and do not fall, taken alone, within the scope of the present invention. For this reason, these details are not described herein and are not shown in the annexed drawings, so as to render the latter easier to understand. Only by way of example, FIG. 1 shows the case in which each floor panel 3 is carried on a supporting platform or pallet 5 which is provided with means for locking the floor panel in a precise position at the welding station.

Figure 2:
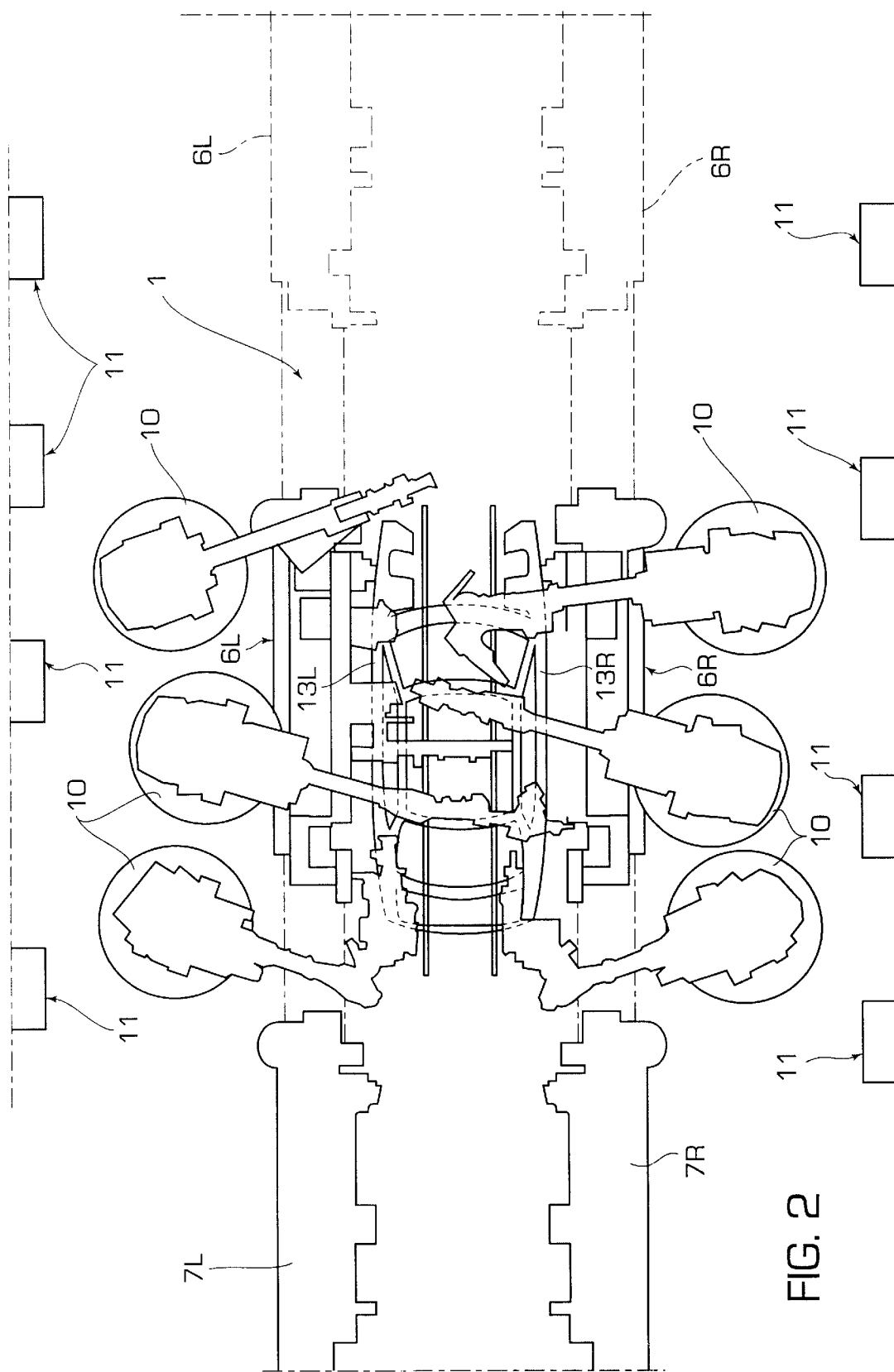
FIG. 2 is a plan view of the welding station of FIG. 1.

At the two sides of the conveyor line 2 (see also FIG. 2), there are provided, according to a technique known per se, two pairs of locating gates 6L,6R and 7L,7R provided with clamping devices adapted to locate the component parts of two different types of bodies to be welded properly at the welding station. Also according to a technique known per se, the two pairs of gates 6, 7 are rapidly interchangeable by a longitudinal movement thereof on the two sides of the line, so that each pair of gates is movable between a work position at the welding station and a waiting position spaced apart therefrom, respectively upstream or downstream of the welding station (FIG. 2). The structure of the locating gates 6, 7 may be made in any known way, but it is preferably of the type illustrated in the previous European patent application EP-A-0 642 878 of the same Applicant. An essential feature of the invention further lies in that each locating gate 6,7 is provided with a self-propelled lower trolley 8 which is guided on a respective longitudinal rail 9 arranged parallel to the conveyor line 2 at the two sides of the welding station. The details of construction of the self-propelled trolley 8 and rail 9 are not illustrated herein for sake of simplicity, since they are of the same type as illustrated in the above mentioned European patent application of the same Applicant. Due to this feature, as already discussed, the locating gates 6, 7 can move for providing the exchange at the welding station, as a function of the type of body which is at said station for welding, without requiring the bulky, heavy and complicated supporting frames which are provided in the classic ROBOGATE stations, in order to guide movement of the locating gates.

Yet with reference to FIG. 1, the movement of locating gates 6, 7 on rails 9 takes place when these gates are in their spaced apart inoperative position, shown with dotted line in FIG. 1. As already indicated in the above mentioned previous European patent application of the Applicant, the rails 9 have separate sections at the welding station which are able to move transversally to the conveyor line, to bring the two locating gates 6 or 7 which are at the welding station from their spaced apart inoperative positions, shown with dotted line in FIG. 1, to close operative positions shown with undotted line in FIG. 1, in which the clamping devices (not shown) provided, in a way known per se, on these gates, can engage the various components of the structure to be welded to clamp them in the proper welding position.

As already discussed above, the conveyor line 2 brings only the floor panel of the body to be welded to the welding station. The assembling of the body to be welded is completed at the welding station itself since, at this station, there are provided programmable manipulating robots 10 of any known type, able to pick up the various components of the two side panels of the body from loading posts 11 and to deliver these components to the two locating gates 6 or 7 which are at the welding station in their spaced inoperative positions. In this condition, each locating gate receives the various elements forming the respective side panel of the body and support them by respective clamping devices, so that each side body panel is pre-assembled on each locating gate. At this time, the two locating gates are moved to their closed operative positions, in which they bring the respective side panels assembled thereon to a position for assembling with the floor panel 3. The body to be assembled is completed with one or more cross-members 12 connecting the two side panels 13L, 13R at the top. Each cross-member 12 is supported by a bridge-like cross-structure 15 which is positioned by one of the manipulating robots 10 above the two locating gates 6 or 7 when the latter are in their close operative positions, by means of clamping devices 14 of the same type as the clamping devices provided on the locating gates 6, 7. The ends of the cross-structure 15 are connected to the upper parts of the two locating gates 6 or 7 by means of automatic quick coupling devices. It is to be noted, that the previous European patent application of the Applicant which has been mentioned above also disclosed the use of a cross-structure for connecting the two locating gates in the operative condition. However, one of the features of the present invention lies in that this cross-structure is also used to carry clamping devices 14 able to support a cross-member forming a part of the body to be assembled.

Once the structure of the body has been assembled at the welding station, with the various components of the body locked in a precise position by means of the clamping devices provided on the locating gates and each bridge-like structure 15, the same manipulating robots 10 carry out a number of spot weldings, naturally after that they have changed their manipulating tool with a welding head, with a totally automated technique, known per se.

Naturally, it is also possible that the manipulating robots 10 mount each side panel of the body already fully assembled, by a single operation, on a respective locating gate, in order to enable the latter to bring the side panel to the condition for assembling with the body floor panel.

Once the body has been welded, the locating gates are again opened and returned to their inoperative positions shown with dotted line in FIG. 1, to enable conveyor line 2 to feed the welded body downstream of the welding station and to bring a new floor panel within the welding station. If this panel belongs to a different body type from that the previously welded body, the entering of the new floor panel into the station takes place simultaneously with an exchange of the two pairs of locating gates at the welding station. This exchange takes place since the lower self-propelled trolley of each locating gate is moved along the respective rail 9. In this manner, the locating gates which were previously in their work position are moved to their waiting position and the other pair of locating gates enters into the welding station.

According to a technique also known per se, when two locating gates are in a waiting position, spaced apart from the welding station, they can be interchanged with further pairs of locating gates picked up from auxiliary magazines of locating gates, for example according to what has been illustrated in British patent application GB-A-2 172 555 of the same Applicant, in which there are provided auxiliary magazines of locating gates provided in a fan-like arrangement, which enable the welding station to be adapted to operate on many different types (e.g. 8) of body.

From the previous description it is clearly apparent that the device according to the invention saves all the advantages of the ROBOGATE system and the system shown in European patent application EP-A-0 642 878, while simplifying and rationalizing further the welding plant. The system lends itself to the case in which it is necessary to start the production of a new model of car initially in a single version, while the introduction of an additional version within a determined time is foreseen. In this case, the plant is initially installed with a single pair of locating gates, but the latter are anyhow provided with self-propelled lower trolleys which are engaged on floor rails, so as to render easy to adapt the device also to the second version of body by introducing a further pair of locating gates. Under this aspect, a system which is provided in the above described way (a single pair of locating gates with self-propelled trolleys mounted on rails) would represent an equivalent reproduction of the device of the annexed claim 1, since it is clearly apparent that the trolleys and the rails would be used in order to be able to introduce a second pair of interchangeable locating gates.

Naturally, while the principle of the invention remains the same, the details of construction and the embodiments may widely vary with respect to what has been described and illustrated purely by way of example, without departing from the scope of the present invention.

What is claimed is:

1. Device for spot welding of structures constituted by metal elements, particularly motor-vehicle bodies or sub-assemblies thereof, said device being able to operate on at least two different types of structures, said device comprising:

a welding station, provided with automatic spot welding means, a conveyor line for feeding the welded structures going out of the welding station in sequence downstream thereof, at least first and second locating gates which are rapidly interchangeable at the welding station and carry devices for clamping the component elements of the structure to be welded in the proper mutual assembling position, said locating gates being provided for operating respectively on two different types of structure to be welded, the locating gate which each time is at the work area at the welding station being further movable transversally to the conveyor line between an operative position, in which the clamping devices carried by said gate locate the components of the structure which is at the welding station in the proper mutual position, and an inoperative position, in which the locating gate allows a welded structure to get out of the welding station, each locating gate being provided with a lower self-propelled trolley guided on a rail provided along the floor of the welding station, so as to be movable between a work position at the welding station and a waiting position spaced apart therefrom, so that the station has no supporting frames for guiding movement of the locating gates, wherein said conveyor line each time feeds only a part of the structure to be welded to the welding station and wherein said device further comprises manipulating means to pick up further elements constituting the structure to be welded from respective loading posts, said further elements being for forming said structure along with the part which is already at the welding station by being brought thereto by said conveyor line, said manipulating means being able to deliver said components picked up at said loading posts to the locating gate which is at the welding station, and said locating gate being able to receive and support these components by means of its clamping means, so that when said gate is brought to its operative position it enables these components carried thereon to be assembled with the part which is already at the welding station so as to locate the whole structure for welding, wherein the body to be welded is further comprised of at least one cross member adapted to be connected to said side panels at the top thereof and further comprising a cross bridge-like structure adapted to carry said at least one cross member and position said at least one cross member for welding to said side panels, said cross bridge-like structure having opposite end portions detachably connected to upper parts of the two locating gates when said locating gates are in their operative close positions.

2. Welding device according to claim 1, wherein said automatic sport welding means comprises programmable robots provided with welding heads, and wherein said robots also constitute said manipulating means which deliver the components of the structure to be welded to the locating gate which is at the welding station, said robots being provided with manipulating tools interchangeable with said welding heads.

3. Welding device according to claim 2, said device being used for welding motor-vehicle bodies, wherein, there are provided two pairs of locating gates at the two sides of the conveyor line which are rapidly interchangeable at the welding station, the gates of the pair which is at the welding station being close to each other in said operative position and being spaced apart from each other in said inoperative position, and in that said conveyor line feeds only the floor panel of the body to be welded to the welding station, whereas the pair of locating gates which is at the welding station receives two respective side panels, which are to form the body to be welded from the manipulating means.

4. Welding device according to claim 1, wherein said cross bridge-like structure is also provided with clamping devices in order to support and locate the respective cross-member of the body.

5. Welding device according to claim 4, wherein said bridge-like cross-structure is provided in order to be conveyed and mounted over said locating gates by said manipulating robots.

6. Welding device according to claim 1, wherein there are provided means for exchanging the pair of locating gates which is in a waiting position, with yet a further pair of locating gates, corresponding to yet a further type of body to be welded, which is picked up by a magazine of different locating gates corresponding to different types of body.

* * * * *